(12) United States Patent
Asplund (10) Patent No.: US 9,162,577 B2
(45) Date of Patent: Oct. 20, 2015

(54) SYSTEM ADAPTED FOR ONE OR MORE ELECTRICALLY PROPELLABLE VEHICLES (CONTACT MEANS)

(75) Inventor: Gunnar Asplund, Solna (SE)

(73) Assignee: ELWAYS AB, Solna (SE)

( * ) Notice: Subject to any disclaimer, the term of this patent is extended or adjusted under 35 U.S.C. 154(b) by 238 days.

(21) Appl. No.: 13/638,621

(22) PCT Filed: Mar. 31, 2011

(86) PCT No.: PCT/SE2011/050378
§ 371 (c)(1),
(2), (4) Date: Oct. 1, 2012

(87) PCT Pub. No.: WO2011/123047
PCT Pub. Date: Oct. 6, 2011

(65) Prior Publication Data
US 2013/0025989 A1    Jan. 31, 2013

(30) Foreign Application Priority Data
Apr. 1, 2010 (SE) .................................... 1000324-2

(51) Int. Cl.
| B60M 1/30 | (2006.01) |
| B60L 5/42 | (2006.01) |
| B60M 1/36 | (2006.01) |
| B60M 7/00 | (2006.01) |

(52) U.S. Cl.
CPC .. *B60L 5/42* (2013.01); *B60M 1/36* (2013.01); *B60M 7/003* (2013.01); *B60L 2200/26* (2013.01)

(58) Field of Classification Search
USPC ....... 191/2, 3, 14, 22 R–25 R, 22 C; 104/139, 104/140, 142, 146
See application file for complete search history.

(56) References Cited

U.S. PATENT DOCUMENTS
4,129,203 A * 12/1978 Berman .......................... 191/48

FOREIGN PATENT DOCUMENTS
| EP | 0505845 A1 | 9/1992 |
| WO | 9310995 A1 | 6/1993 |
| WO | 2007056804 A1 | 5/2007 |

OTHER PUBLICATIONS

Written Opinion of the International Searching Authority issued on Jun. 21, 2011 by the SE International Searching Authority in International Application No. PCT/SE2011/050378.
International Search Report issued on Jun. 30, 2011 by the SE International Searching Authority in International Application No. PCT/SE2011/050378.

* cited by examiner

*Primary Examiner* — R. J. McCarry, Jr.
(74) *Attorney, Agent, or Firm* — Raymond R. Ferrera; Adams and Reese LLP (57) ABSTRACT

The present invention has its application to a vehicle-related arm-shaped contact means ((4)) related to a contact means arrangement as a current collector or system ("S") for propelling an electrically, i.a. by batteries ("II", B), propellable vehicle (1) along a roadway (2) comprising "a" a plurality of roadway portions (2a, 2a1), wherein said road portions are allotted at least one track or slit (51, 52), having introduced therein current supplyable conductors (4a, 4b), and "b" one or more powerable vehicles (1), with each vehicle exhibiting a control circuit (100, "R1") adapted for necessary distribution of power, wherein said vehicle (1) is on its underneath side provided with a displaceable contact means ((4)) as said current collectors. Said current collector (41,41') is shaped as a main portion (141), made of an electrically insulating material, and having a lower surface (142) facing towards the contact surface (4a') being shaped flat, and having a lower contact surface (144) consisting of an electrically conductive material (160). The electrically conductive material (160) is adapted to extend through the main portion (141) for forming one or more upper contact surfaces (146a) and/or connecting conductors (146b).

13 Claims, 5 Drawing Sheets

SYSTEM ADAPTED FOR ONE OR MORE ELECTRICALLY PROPELLABLE VEHICLES (CONTACT MEANS)

TECHNICAL FIELD OF THE INVENTION

This invention refers generally to an arrangement in the form of a contact means as current collector, said contact means is related to vehicles, specifically to such a vehicle-related arrangement which is adapted to be able to elevate and lower said contact means and/or a contact device serving as current collector or current remover, with each vehicle being adapted to a system appropriate and adapted for electrically propellable vehicles and more particularly to such system in which i.a. one or more batteries and/or a set of batteries for power adaptation and energy storage are intended for being able to propel the vehicle rolling along a stretch of a roadway.

Systems of this type are based on utilizing a specifically designed stretch of the road or roadway wherein the upper surface of this stretch of the roadway exhibits at least one track in the form of a groove and in which track one, two or more parallel electric conductor or strip with a conductor surface, which may be placed under power or voltage are disposed and which preferably is provided with an uncovered and uninsulated contact surface section.

In accordance with the instructions of the present invention such system is to comprise; "a" a plurality of roadway sections or portions subdividing the total stretch of the roadway and each section allotted to one or more electrically conductive surfaces, such as conductors or strips, said roadway sections being connectable over a switch to one or more stationary electric stations, serving as a source of power or energy external to vehicles so as thereof i.a. to charge batteries belonging to vehicles and/or set of batteries intended primarily to propel the vehicle by means of said set of batteries along the stretch of the roadway and its roadway sections and "b" one or more, over an individual electric motor or a plurality of motors, propellable vehicles, wherein each of said vehicles is to exhibit a control circuit, controlling the power so as to create a chosen and required propelling effect and/or a speed adaptation and/or control.

The invention is to be applied to stretches of roadways in the form of public and private roads and along their road sections but can also find use in industrial systems, having different requirements of power and energy.

The invention has the purpose i.a. of concurrently with power charging of the set of batteries from the external source of energy supplying the power and the energy which will be required for a chosen power requirement for driving the vehicle upwards and over an upwardly rising portion of the roadway.

More particularly the present invention refers to such system in which a non-rail-bound vehicle, such as a freight vehicle, while being driven along chosen roadway sections by means of the set of batteries allotted to the vehicle, can be supplied with supplementary power and energy, such as from the external source of power or alternatively from a source of power related to the vehicle, such as a diesel generator.

In this regard the present invention proposes a "first" source of power related to the vehicle, such as a diesel generator, a "second" source of power related to the vehicle, such as a battery set, and a "third" source of power separated from the vehicle and being disposed externally, such as two or more conductor surfaces, such as conductors or strips which may be placed under power and be included in tracks or grooves in successive roadway sections with the conductors of a chosen roadway section being electrically insulated from corresponding conductors in an adjacent (preceding or succeeding) roadway section or portion.

The present invention is based on having one, two or more conductors built into one track or into individual tracks or grooves in their respective roadway sections, with said tracks (not the conductors) extending continually from roadway section to roadway section.

The voltage which is allotted to these conductors or surfaces can be an alternating voltage (AC-power) (with a vehicle-related rectifier) or a direct voltage (DC-power). In choosing a DC-power one of the conductors can be positive, whereas the other conductor can be negative and an additional conductor can be allotted ground potential or zero potential, with the vehicle thus being operated at twice the value of the voltage.

With alternating voltage to the conductor or surfaces of the roadway sections said voltage can to advantage be disposed in anti-phase and symmetrically around a ground potential or zero potential.

The motor intended for driving the vehicle can be of a DC-power type or of an AC-power type, with a converter being connected prior to the motor in the latter case.

BACKGROUND OF THE INVENTION

Methods, arrangements, and structures related to the technical field and character mentioned above are known earlier in a number of different embodiments.

With regard to electrically propellable vehicles, the latter can to advantage be categorized as "railbound vehicles" or as "non-railbound vehicles".

"Railbound vehicles" are driven along their stretch of the roadway and roadway sections on parallel rails, disposed along the stretch of the roadway or on parallel rails laid open by sleepers or the like and guiding the fixed pairs of wheels of the vehicle.

"Non-railbound vehicles" are conveyed along their stretch of the roadway and roadway sections over a roadway and are driven along the roadway sections by a steering control equipment associated with the vehicle.

The present invention is based on and is intended to be used in the latter category and technology and is intended to be applied primarily to heavy trucks with or without connected trailers.

From Patent Publication U.S. Pat. No. 4,129,203-A a vehicle-related arrangement is known for letting contact springs, disposed beneath the vehicle be brought upwards and downwards and sideways towards and to mechanical and electrical cooperation with or away from cooperation with non-insulated contact surface sections of the electric conductor surface (14) subject to voltage and associated with each roadway section or portion.

Utilizing an insulator (16) in a channel (18) which supports the conductor surface in the form of rails (14) is indicated here. A cover plate (20) provided with a slit (12) is removably attached to the upper and opposing wall portions of the channel (18), with this cover plate (20) being adjusted to a plane connecting to the upper surface (22) of the roadway section or portion.

FIGS. 2 and 3, respectively, in the mentioned Patent Publication describe a vehicle-related table (98), to which an arm (10) is rotatably attached (94, 96, 99). Sensors (30) allotted to the table (98) generate signals which, with regard to their phase and magnitude, indicate the direction to and distance from an axis (99) of rotation to a slit (12) in the cover plate (20), which is based on changes in a generated magnetic field. The table (98) and arm (10) can be driven over a designated mechanism (31) by a motor (32) between predetermined limits senses by limit switches (40, 41) positioned there.

Patent publication WO 93/10995-A discloses an earlier known system for driving electrically controllable vehicles along a roadway and its roadway sections.

FIG. 9 in the mentioned patent publication clarifies the basic structure of the system.

It is instructed here that the extension (14) of the roadway and its roadway portions are to be provided with electrically conductive roadway sections (300a-300f), wherein a roadway section may be considered to correspond to a roadway portion.

The vehicle (310) has an electric motor (320) and two (312, 314) or three (312, 312' and 314, respectively) contact springs lying therebelow and being adapted for a mechanical and electrical contact with the electrically conductive conductors or surfaces, whose lengths are adapted to correspond to a chosen length (identically equal lengths) for utilized roadway sections.

The electrically conductive conductors or surfaces in the road sections (300a-399f) are disposed after each other with an intermediately oriented free space (302a-302e), so as thereby to prevent short-circuits in consequence of dragging contact springs (312, 312', 314).

Every other roadway section (300b, 300d, 300f) is here connected continually to a reference voltage (ground potential), whereas the remaining roadway sections (300a, 300c, and 300e, respectively) are either directly connectable to a source (440) of DC-voltage or connected, over a connecting means (304a, 304b, 304c) to any appropriate electric power source (308) when a vehicle is in the vicinity.

When an embodiment having three contact springs is to be utilized the distance between them is to be chosen such, that two or three contact surface sections always are in electric contact with two roadway sections exhibiting opposite polarities and that neither of the two contact sections is to be able to short-circuit the open space (302a-302e), between two adjacently positioned sections.

For its function the system here requires specially structured vehicles (310), wherein the chosen distance between front (314) and rear (312, 312') contact means is to be identical and furthermore to be chosen somewhat greater than the equal lengths of the roadway sections (300b, 300d).

Thus, specially structured vehicles, with front and rear contact means, are required and in which each one of the utilized roadway sections (300a-300f) is to be chosen having equal lengths and they are to be positioned behind each other, in an end-to-end orientation, in the direction of motion of the vehicle with equal mutual free and intermediately lying spaces (302a-302e).

The remainder of the Patent Publication shows the existence of a single conductor or rail subjected to voltage in a roadway section (Page 5, lines 11-13) and that a vehicle is to attract a voltage to a roadway section lying in front (page 5, lines 19-21; page 6, lines 7-10; page 8, lines 28-32, respectively).

Furthermore it is indicated that bars or rails (16), which may be subjected to voltage, can be provided with side-positioned drainage tracks (page 9, lines 1-4).

Lack (or presence) of an activating signal is to be able to influence a control unit (38) (page 8, lines 23-27, respectively).

The necessary distance between vehicle-associated contacts is disclosed in lines 17-20 of page 10, and utilizing activity-initiated radio signals is suggested in lines 2-4 of page 11 and lines 1-16 of page 14, respectively.

Furthermore, in lines 21-23 of page 15 and lines 1-15 of page 16, it is disclosed the utilizing of a Hall-element (240) and connecting it to an amplifier (246). Furthermore, alternatives thereof are illustrated in lines 3-9 of page 17.

It is also known to have a vehicle driven electrically along a stretch of roadway by means of inductive transfer of energy active between a vehicle and a roadway section laying therebelow.

As further examples of this known technology reference is also made to the contents of Patent Publications U.S. Pat. No. 3,914,562-A and U.S. Pat. No. 4,007,817-A, respectively.

Patent publication WO 2007/056 804 A1 describes and discloses a plurality of means, devices and/or arrangements, which have relevance when evaluating the significant features related to the prior art and also to the present invention. However, these means, devices and/or arrangements are only mentioned in general terms, and only a few or no suggested structure is disclosed.

The contents of this patent publication will be described in the following and coordinated in the following subsections;
a. Pairs of electrically conductive contacts or strips oriented along a roadway.
b. Switching means to supply DC power to a roadway related pair of electrically conductive contacts or strips. (DC network).
c. Vehicle related transmitter.
d. Vehicle related pick-up arms.
e. DC-voltage difference between roadway related conductors, contacts or strips.
f. Orientation of the roadway related conductive strips.
g. Power supply system.
h. Detector means or arrangement.
i. Power supply to an adjacent pair of conducting strips.
j. Sensor arrangement.
k. Conditions for activating switching means.
l. Battery arrangements.
m. On-board charging engine.
n. Overload cut-off and re-close switch.
o. Safe conditions of bare electric roadway related electric conductors or strips.
p. Use of DC voltage or AC voltage to supply power to the roadway related electric conductors or strips.
q. Magnetic field sensor.
r. Snow plough and blower arrangements.
s. Electrical heating tape.
a. Pairs of Electrically Conductive Conductors or Strips Oriented Along a Road-Way.

It is suggested in the above-mentioned International Patent Publication that each pair of electrically conductive strips (members) be electrically insulated from an adjacent and another pair of electrically conductive strips, and wherein a vehicle traveling along said roadway travels over a first pair of electrically conductive strips and then travels over a next adjacent pair of electrically conductive strips and so forth.
b. Switching Means to Supply DC Power to a Roadway Related Pair of Electrically Conductive Contacts or Strips (DC-Network).

A source of direct current electricity (DC-network) is arranged to provide a DC power to the roadway related pairs of electrically conductive strips (members).

Switching means are operative to supply DC power to a pair of electrically conductive strips when a vehicle travels over that pair, said switching means being operative to turn off the supply of DC power to a pair of electrically conductive strips when no vehicle travels over and along that pair of electrically conductive strips.

This improves the safety of the system as suggested (page 2, lines 13-17) in that switching means are operative to supply DC power to said pair of electrically conductive strips (members) only when a vehicle travels over that pair, the switching means being operative to turn off the supply of DC power to a pair of electrically conductive strips when no vehicle travels over that pair of electrically conductive strips.

Said Patent Publication further mentions (page 1, lines 7-21) a prior art system for the universal use of electrically powered roadway vehicles. A system of this kind uses a succession of 20 meter long copper strips fixed onto a roadway surface. The respective 20 meter long copper strips were positioned end to end along each lane of the roadway and were electrically insulated from each other.

Alternating current electric power (AC-network) was applied to each section or portion.

c. Vehicle-Related Transmitter.

When an appropriate electrically powered vehicle travels over the respective sections of copper strip, a transmitter, mounted to the vehicle, turns on the power supply to that section of copper strips on which the vehicle is traveling.

d. Vehicle Related Pick-Up Arms.

Electrically operated pick-up arms on the vehicle are adapted to contact the copper strips and to obtain electricity from the roadway-related copper strips.

This electricity from the copper strips is used to run a vehicle-related electric motor on board the vehicle (and also to activate vehicle accessories and, optionally, to recharge batteries on the vehicle).

The electricity supply to each copper strip is only turned on during 1.5 seconds, i.e. the time period during which the vehicle passes over that section of copper strips.

In the absence of a signal from a vehicle, the power to that section of copper strip remains off.

In order for the vehicle to be able to pick up electric power from the roadway-related conductors or strips positioned on the roadway surface, the vehicle may be provided with a pick-up arm located under the vehicle body.

The pick-up arm may comprise a flat plate hinged to the underside of the vehicle.

Two pick-up carbon brushes may be bonded to the plate, for example by an epoxy resin or adhesive.

Leads carry the power from/to each brush to the vehicle (to the motor controller and battery pack of the vehicle). (page 7, lines 8-13)

The pick-up arm may be retracted and extended automatically.

For example, if the vehicle detects that it is traveling over a pair of electrically conductive strips (members), the pick-up arm may be automatically extended downwardly such that the brushes contact the electrically conductive strips.

In one embodiment, the electrically conductive arm is operated such, that if power is lost for more than a predetermined time period, such as from one-half to one second, the pick-up arm is automatically retracted. (page 7, lines 14-19)

Vehicles traveling over the pairs of copper strips must be able to pick up electric power from those strips.

A large number of different designs may be used in this regard. However, one possible design is shown with reference to FIG. 2.

Figure 2:
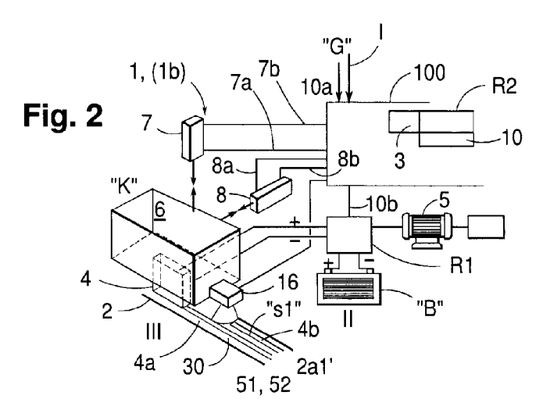

In FIG. 2 a vehicle 50, having wheels 52, 54, is provided with a plate 56. Plate 56 may for example be approximately 1.620 mm wide and 100 mm long.

The plate 56, as shown in FIG. 2, stretches approximately across the full width of the vehicle.

The plate 56 may be provided with one or more holes to enable air to pass there-through to reduce the amount of down force acting on the plate when the vehicle is traveling.

The plate 56 carries two electrically conductive brushes 58, 60.

A gap 62 is located between the brushes 58, 60. As an example, each brush may be 800 mm wide and the gap may be 20 mm wide.

The gap 62 may be filled with an electrically insulating material, suitably an insulating material that is somewhat soft and can yield without breaking, should it contact an object. (Page 14, lines 7-18).

The use of a wide pick-up plate eliminates the need for a lateral traversing mechanism for the pick-up arm.

It also eliminates the need for any device to detect the vehicle's lateral position in relation to the electrically conductive strips.

All a driver has to do to achieve initial contact is to drive along the electrically conductive strips somewhere within the vehicle's track and move the pick-up arm to the down position.

Contact will be maintained so long as the electrically conductive strips remain within the vehicle track.

Automatic steering may be used to assist in this regard on a longer drive. (Page 14, lines 27-30, page 15, lines 1-2)

The brushes 58, 60 must be able to be lowered onto the strips or retracted against the underside of the vehicle.

To this end, the brushes are mounted on a pair of pantograph arms 64, 66.

The pantograph arms keep the plate 56 (and therefore the brushes 58, 60) horizontal.

Appropriate electrical connections may be provided to enable the electrical power picked up from each of the brushes 58, 60 to be transferred to the vehicle.

The pantograph arms may carry appropriate electrical cables to transfer electric power from the brushes to the vehicle. (Page 15, lines 4-10)

e. DC-Voltage Difference Between Roadway Related Conductors, Contacts or Strips.

It is further suggested (page 2, lines 18-22) that preferably DC power with its voltage exposes a difference between each conductor or strip in a pair of conductors and that said voltage does not exceed 600 volts. More preferably, the DC power and its voltage difference between each conductor in a pair of conductors or strips do not exceed about 450 volts. Suitably, each conductor is at a voltage relevant to earth that does not exceed plus or minus 250 volts, more preferably not exceeding plus or minus 225 volts.

f. Orientation of the Roadway Related Conductive Strips.

The electrically conductive strips may be positioned on the roadway surface such that they are insulated from each other and from earth (the road surface). Suitably, the electrically conductive strips are laid onto an adhesive insulating base, which insulates them from each other.

The electrically conductive strips may be bonded to the roadway surface by an epoxy adhesive. Alternatively, the electrically conductive strips may be bonded to tiles that are then placed in or on the roadway surface.

g. Power Supply System.

The power supply system comprises a series of separate, electrically insulated but electrically conductive strips.

Each pair of strips represents a power supply section.

Each pair of strips may be provided with a dedicated source of DC power.

Alternatively, a source of DC power may provide direct current electricity to two or more pairs of strips.

h. Detector Means or Arrangement.

The switching means is suitably operatively associated with a detector means for detecting the presence of a vehicle, either about to move onto a pair of conductors or strips or on a pair of conductors.

For example, the coded signal may comprise an oscillating voltage similar to that used by utility companies for control purposes.

Such a control signal may have a frequency in the order of 400 kHz and a voltage of up to about 4 to 20 volts.

It will be understood that the coded signal may utilize different frequencies and different voltages from those given above. (Page 4, lines 19-29)

When one roadway section of conductors or strips is turned on, a control signal may be sent to the power supply for the next section of conductors along the path of travel of the vehicle.

This control signal, sent to the power source for the next section of conductors or strips, is used to turn on the power supply to the next section of conductors, either shortly before or just as the vehicle arrives at the next section of conductors.

Alternatively, the control signal sent to the next section of conductors or strips may turn on the power supply to that next section of conductors at a predetermined time after the power supply to the first set of conductors or strips is activated.

In order to detect the arrival or imminent arrival of a vehicle in a section of copper strips, the vehicle may be provided with a coded signal that becomes superimposed on the strips when the vehicle travels over a section or portion of the copper strips and the brushes on the vehicle are in contact with the strips.

The coded signal is received by a detector associated with a corresponding transformer station.

The detector actuates the switching of power up to that particular section of the strips.

i. Power Supply to an Adjacent Pair of Conductive Strips.

The power supply to the next set of conductor means or strips is maintained, provided that the next set of conductors or strips detects that the vehicle enters the next set of conductors or strips within a specified time period after the power supply to the next set of conductors or strips has been turned on.

In this way, if the vehicle turns off the roadway and therefore does not enter the next set of conductors or strips, the next set of conductors or strips will not detect the presence of the vehicle and therefore will shut off the power supply shortly after it has been turned on.

In this embodiment, the adjacent sections of conductors "talk" to each other and interact with each other to turn on the power supply to each roadway section with its strips either just before or just as a vehicle arrives at each section.

j. Sensor Arrangement.

A sensor arrangement may be located towards the "downstream" end of each pair of strips.

The sensor arrangement may, for example, be a current flow sensor positioned below or adjacent to one of the electrically conductive strips.

When a vehicle is near the end of a roadway section (of electrically conductive strips), the sensor will sense the resultant current flow and then send a signal to the next section of electrically conductive strips to turn on the electricity supply to the next section in "anticipation" of the imminent arrival.

This signal may be sent via cable. The "anticipatory" signal is valid for a short time only, say 2 seconds, and if a vehicle has not arrived at the next section within that time, the next section is turned off.

k. Conditions for Activating Switching Means.

The switching means may be arranged such that the signal that is used to turn on the next pair of conductive strips must be larger than a predetermined minimum value in order to activate the switching means and turn on the next pair of conductive strips.

In this manner, if the next pair of conductive strips is subject to conditions of high electrical leakage, the signal will be lower than the minimum required to turn on the next pair of strips.

This is effective to minimize excessive electrical leakage which could lead to unacceptable power wastage and/or to damage to the transformer/rectifier. (Page 4, lines 28-29, page 5, lines 1-4).

The use of a coded signal also allows for the possibility of enhanced operation and safety by incorporating an electricity leakage test into the apparatus.

In these instances, an electrical leakage detection means may be provided to prevent the next section of conductors or strips from turning on.

Detection of electrical leakage may occur by requiring the coded signal super-imposed on each section of conductors or strips to exceed a predetermined activation threshold value before the next section of conductors or strips will be turned on.

In this fashion, superimposing the coded signal onto the conductors or strips will result in the coded signal representing the criteria not exceeding the predetermined threshold value if conditions of high electric leakage are present. Thus, the next section of conductors or strips will not be turned on in such situations. (page 8, lines 15-28)

l. Battery Arrangements.

The vehicle may be provided with one or more batteries to store electric power or energy.

The batteries may be charged using electricity received from the roadway related electrically conductive strips.

In some embodiments, the DC voltage of the electrically conductive strips is such that it is equal to the normal charging voltage of each battery pack in the vehicle.

This allows for the vehicle motor to have an essentially seamless transition to and from battery and on-road conductors or strips whenever there is a break and then a resumption of the on-road conductors or strips. (page 6, lines 29-30, page 7, lines 1-5)

m. On-Board Charging Engine.

The vehicle may alternatively or additionally be provided with one or more of an on-board charging engine or a regenerative braking system to allow for recharging of the batteries. (Page 7, lines 6-7)

n. Overload Cut-Out and Re-Close Switch.

Each transformer may have an overload cut-out and reclose switch.

This switch suitably operates on the DC side of the transformer and a rectifier. Each DC output line from the transformer and rectifiers may have independent overload switches.

The overload cut-out and re-close switches may be set such, that if three re-close attempts are unsuccessfully made the section is shut down and a signal is automatically sent to the control panel to indicate a fault.

Vehicles may then proceed across this dead section using an on-board battery power system. (Page 12, lines 10-16)

o. Safe Conditions of Bare Electric Roadway Related Electric Conductors or Strips.

A question may be raised as to whether bare electric conductors or strips on a road surface can be safe. In the system here proposed, they are safe.

In particular, the present invention uses mains power but delivers DC voltage at relatively low volts.

Moreover, each copper conductor or strip is insulated from the roadway surface and from the other copper conductor or strip in its respective pair.

Thus, standing on one of the conductors or strips will not complete any circuit and therefore little or no current will flow through a person standing on one of the copper conductors or strips.

Further, the DC voltage supply to the conductors or strips is created by transforming and rectifying high voltage, three-phase (alternating current) AC-power, to give a positive DC-power to one conductor or strip and an equal negative DC-power to the other conductor or strip in each pair of conductors or strips. (Page 12, lines 19-20)

p. Use of DC Voltage or AC Voltage to Supply Power to the Roadway Related Electric Conductors or Strips.

The use of DC voltage rather than AC voltage contributes to the electrical safety of the system.

The actual DC voltage that is supplied to the pairs of copper conductors or strips will depend upon several factors.

For example, the lower the standard DC voltage selected, the lower will be the perceived electrical safety risk, the lower will be the actual energy leakage, when a roadway is wet and the conductors or strips are on, and the fewer the number of battery cells in each vehicle to provide an on-board power supply.

On the other hand, the weight of copper conductors or strips and/or the number of transformers needed for the on-road installation is inversely proportional to the square of the standard voltage.

That is to say, other things being equal, if the voltage is halved, the weight and cost of copper material needed will rise fourfold.

It has been found that possible standard voltages may lie anywhere between about 100 and 600 DC voltage. (Page 12, lines 3-12)

q. Magnetic Field Sensor.

An array of magnetic field sensors may be placed across the front and rear of the vehicle (page 20, lines 3-9) to sense the position of the conductive strips.

r. Snow Ploughs and Blower Arrangements.

The use of snow ploughs and blower arrangements is also suggested. (Page 21, lines 28-30.)

s. Electrical Heating Tape.

It is also suggested to use an electrical heating tape beside each conductor or strip to aid the clean removal of snow and ice in winter time. (Page 22, lines 1-3.)

This invention intends to concentrate towards a vehicle-related arrangement in the form of a contact means, serving as a current collector or current remover and means, for actuating said contact means or current collector upwards and downwards and sideways, said current collector is disposed underneath the vehicle so as to be able to coordinate the utilization of a first and/or a second source of power, belonging to the vehicle, such as a diesel generator and a battery set, and/or a third power source, external to the vehicle and disposed along the stretch of the roadway and its roadway sections or portions and having its upwardly open tracks engaging each other from one roadway section to adjacently arranged roadway section, but however with one, two or more parallel, electric conductor surface and its contact surface (-s) introduced for each roadway section concentrated to the design of said current collector.

Said current collector is according to the present invention formed from an electrically insulating material and enclosing an electrically conductive material.

DISCLOSURE OF THE PRESENT INVENTION

Technical Problem

If the circumstance is considered, that the technical considerations that a person skilled in the relevant technical art will have to carry out in order to offer a solution of one or more posed technical problems are on the one hand initially a necessary insight into the measures and/or the sequence of measures which are to be performed and on the other hand a necessary choice of the one or several means which are required, the following technical problems must be considered to be relevant in consequence hereof in producing the present subject of invention.

Considering the earlier standpoint of technology, as it has been described above, it should therefore be seen as a technical problem to be able to understand the significance of, the advantages related to and/or the technical measures and considerations which will be necessary for conveying an electrical, and by i.a. one or more batteries in a set of batteries, conveyable vehicle along a stretch of a roadway and its roadway portions adapted system, which is to comprise; "a" a plurality of road sections or portions for subdividing the stretch of the roadway, wherein each one of these roadway portions is allotted one or more elongated tracks or slits having introduced therein current supplyable and under voltage placeable electrically conductive conductors or strips connectable over a switch to one or more power sources as stationary electric stations, serving as an external source of power (designated as a third source of power in the following) of the vehicle so as to thereby i.a. charge said set of batteries associated with the vehicle, which set is to be able to propel the vehicle directly along the roadway sections, and "b" one or more vehicles, propellable over an individual electric motor or motors, and wherein the respective vehicle exhibits a control circuit, controlling the necessary power for creating necessary power and/or speed control, indicating the possibility of utilizing equal or different lengths of parallel electric conductors or strips, which may be subjected to electric power or voltages, related to mutually electrically insulated road sections so as to therein offer a possibility of choosing the lengths of the conductors and road sections in response to established requirements of a "continuous" supply of energy to the vehicle and its set of batteries and wherein the lengths of the respective roadway sections to advantage can be chosen considerably longer than the total length of the vehicle, so that no adaptation of the lengths of the roadway sections to any standard lengths of the vehicles will be required, such as in known technology.

There is a technical problem or a technical consideration in being able to understand the significance of, the advantages related to and/or the technical measures and considerations, which will required for in a vehicle related contact means as a current collector, which is intended to be able to run freely along a track, oriented along the stretch of a roadway, with said current collector formed with a main portion, shaped from an electrically insulating material, the lower contact surface of which, facing towards a roadway supporting, contact surface, to which voltage may be applied, and being shaped flat, or at least basically flat with said lower contact surface, consisting of electrically conductive material, disposed within said lower surface and with said electrically conductive material being adapted to extend through said main portion shaped form an electrically insulating material so as to form, in the upper surface of the main portion, one or more upper contact surfaces and/or connecting conductors.

There is a technical problem in being able to understand the significance of, the advantages related to and/or the technical measures and considerations which will be needed for letting the main portion be allotted a chosen surface spread or extension along the track and having a thickness corresponding to but somewhat more narrow than the width of the track and having the shape of, or keeping closely in line with but somewhat more narrow than, the width of the track, or being similar to the shape of a parallelogram or a beveled parallelepiped.

There is a technical problem in being able to understand the significance of, the advantages related to and/or the technical measures and considerations which will be necessary for letting upper and lower surfaces of said parallelepipedic formed main portion being adapted to be parallel or at least substantially parallel.

There is a technical problem in being able to understand the significance of, the advantages related to and/or the technical measures and considerations which will be necessary for letting two or more individual contact means as current collectors, being extended and arranged along the track, and being coordinated with one and the same conductor surface or contact surface, which will be placed under voltage, and apart from this being adapted to form current paths connected in parallel and exposing a reduced current value for each current path.

There is a technical problem in being able to understand the significance of, the advantages related to and/or the technical measures and considerations which will be necessary for having a first main portion of a contact means as a current collector be allotted a beveled parallelepipedic shape, said shape is to deviates from a beveled parallelepipedic shape of an another (second) main portion, related to another current collector, the first main portion being connected in series with said second main portion, and related to one and the same conductor surface or contact surface.

There is a technical problem in being able to understand the significance of, the advantages related to and/or the technical measures and considerations which will be necessary for forming two or more, in series related or connected lower contact surfaces for one and the same main portion.

There is a technical problem in being able to understand the significance of, the advantages related to and/or the technical measures and considerations which will be required for letting resilient or spring means be adapted to urge the first and/or the second main portion and/or its lower contact surfaces with a chosen pressure against the conductor and its upper contact surface, which may be placed under voltage.

There is a technical problem in being able to understand the significance of, the advantages related to and/or the technical measures and considerations which will be required for having two or more contact means as parallel oriented current collectors disposed in parallel, along its track and each being allotted to two or more parallel tracks.

There is a technical problem in being able to understand the significance of, the advantages related to and/or the technical measures and considerations which will be required for letting a vehicle related contact means as a current collector, at least with its lower electrical conductive contact surface, be formed or manufactured of steel, stainless steel, copper, brass, bronze, aluminum and/or hard coals.

There is a technical problem in being able to understand the significance of, the advantages related to and/or the technical measures and considerations which will be required for letting a roadway section related contact means or a current collector and its contact surface, which may be placed under voltage, be made of steel, stainless steel, copper, brass, bronze, aluminum and/or hard coals.

There is a technical problem in being able to understand the significance of, the advantages related to and/or the technical measures and considerations which will be required for letting said lower vehicle related contact surface be adapted so as to engage, with a force of between 1 and 15 N/cm$^2$, said conductor surface and/or to a roadway section related contact surface, which may be placed under voltage, such as about 3 N/cm$^2$.

There is a technical problem in being able to understand the significance of, the advantages related to and/or the technical measures and considerations which will be required for having said two or more conductor surfaces or contact surfaces, which may be placed under voltage, be coordinated along the bottom section of respective track, formed and shaped within one and the same canalization.

There is a technical problem in being able to understand the significance of, the advantages related to and/or the technical measures and considerations which will be required for having conductor surfaces or contact surfaces, which may be placed under voltage, be shaped as rails, strips and/or bands having an upper wide contact surface and being of limited thickness.

There is a technical problem in being able to understand the significance of, the advantages related to and/or the technical measures and considerations which will be required for letting said canalization be produced as a bendable unit and to be enough flexible for being bendable to a roll, easily transportable.

The Solution

This invention has as its purpose of indicating a further development of the arrangement mentioned above and in a system as disclosed above and apart from this to indicate utilization of the prerequisites mentioned above by letting a vehicle related contact means as a current collector be intended to be able to run freely along a track, oriented along the stretch of the roadway and, whereby said current collector is formed with a main portion, structured or formed from an electrically insulating material, having its lower sliding surface, facing the conductor surface and its contact surface, placed under voltage being made horizontally flat, or at least essentially flat, with a lower contact surface disposed within said lower sliding surface and consisting of an electrically conductive material, and having said electrically conductive material being adapted to extend through the main portion for forming thereon one or more upper contact surfaces and/or connecting pads for conductors.

The main portion is then to be allotted a surface spreading or extension along the track and having a breadth connecting to, or being somewhat more narrow than, the width of the track, and having the shape of a parallelogram or a beveled parallele-piped or connecting to or adapting to such shape.

The upper and lower surface extensions of a parallelepipedic formed current collector formed as a contact means should be parallel adapted.

Two or more individual contact means as current collectors are coordinated, along an extension of the track, to one and the same conductor surface or contact surface, being placed under voltage, and apart from this adapted to be able to form parallel oriented and interconnectable current paths.

The shape of a first main portion can be allotted the form of a beveled parallelepiped which is to deviate from a beveled parallelepipedic shape of a second main portion and which two main portions are to be related in series to one and the same conductor surface or contact surface.

Two or more lower contact surfaces are allotted to a lower or bottom surface of its main portion.

A resilient or spring member is to be adapted to urge a main portion and its lower contact surface or lower contact surfaces with an adapted contact force against the conductor surface or contact surface, which may be placed under voltage.

Two or more current collectors can with its main part and contact surface be disposed in parallel and adapted to individual ones of two or more parallel tracks.

The vehicle related current collector is, at least with its lower contact surface, formed of steel, stainless steel, copper, brass, bronze, aluminum and/or hard coals.

The current collector is allotted, at least to one lower contact surface, the shape of a brush unit, consisting of steel, stainless steel, copper, brass, bronze, aluminum and/or hard coals.

The roadway related conductor surface or contact surface, which may be placed under voltage, is to be shaped of steel, stainless steel, copper, brass, bronze, aluminum and/or hard coals.

The lower part of said contact surface of said current collector is adapted to engage said roadway related conductor surface or contact surface, which may be placed under voltage, with a force of between 1 and 15, such as 2 to 5 N/cm$^2$, directed against said conductor surface and its contact surface, which may be placed under voltage.

Said two or more conductor surfaces of said roadway, which may be placed under voltage, are to be coordinated to the bottoms or bottom areas of their respective tracks, formed in one and the same canalization.

Said conductor surfaces or contact surfaces, which may be placed under voltage, are shaped as rails, strips, bands or the like with an upper wide contact surface and exposing a limited thickness.

The canalization is to be flexible and as such bendable to a roll as a unit.

Advantages

It is indicated or suggested here that the vehicle and its vehicle related contact means, such as a current collector, is to be intended to be able to run freely along a track disposed along the roadway, that the current collector is basically formed from a main portion, based on an electrically insulating material, whose lower surface is facing the conductor surface or contact surface, which may be placed under voltage, said main portion is of a flat shape and/or at least essentially of a flat shape, with a lower contact surface disposed within said lower surface and consisting of an electrically conductive material and in that said electrically conductive material is to be adapted to extend through the main portion, for forming one or more upper contact surfaces (pads) or connecting conductors, to the upper surface of said main portion.

The subject matter which may be considered to be characteristic of an arrangement related to the vehicle and related to contact means, in accordance with the present invention, is disclosed in the characterizing portion of the attached and succeeding claim 1.

SHORT DESCRIPTION OF THE DRAWINGS

Prior art and a presently proposed embodiment, exhibiting the significant characteristics related to the present invention, will now, as an example, be described more specifically with reference to the accompanying drawings, in which.

DESCRIPTION OF THE PRESENTLY PROPOSED EMBODIMENTS

By way of introduction it shall be mentioned that in the following description of presently proposed embodiments exhibiting the significant characteristics related to the invention and being clarified by the figures illustrated in the accompanying drawings, we have chosen terms and specific terminology with the purpose of thereby primarily clarifying the concept of the invention itself.

However, in this connection it should be noted that the terms chosen here shall not be seen as limiting solely to the terms utilized here and it should be understood that each such term is to be construed such that in addition it will include all technical equivalents which operate in the same manner or essentially the same manner so as thereby to be able to achieve the same or essentially the same purpose and/or the same technical result.

Thus, with reference to the accompanying drawings the basic prerequisites of the present invention are shown schematically and in detail, with the significant characteristics related to the invention being concretized in consequence of the now proposed and in the following more specifically described embodiments.

Figure 1A:
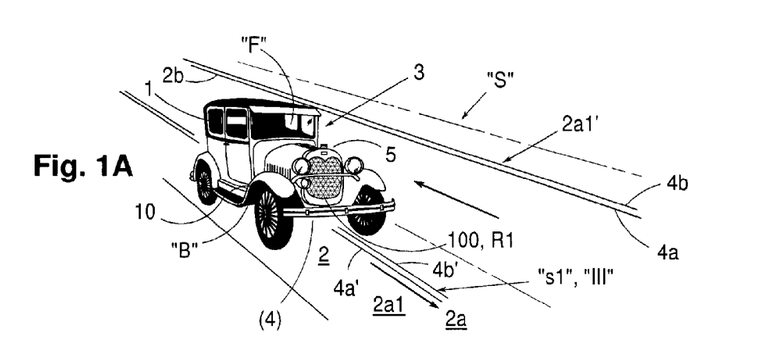
FIG. 1A shows a perspective view of a vehicle, illustrated as a Ford Model A, converted to being battery powered and having an electrically powered engine or motor, a control circuit controlling the power for speed control and adaptation to an instantaneously acting load and necessary power, as well as a control arrangement or control equipment intended for use in driving and steering the vehicle.

Thus, FIG. 1A shows a system "S" adapted for driving an electrically, and by one or more batteries or a set of batteries, propellable vehicle 1 along a stretch of a roadway 2 and its roadway sections or portions 2a1 and 2a1'.

Exteriorly the vehicle 1 consists of a Ford Model A, but this is converted to a battery powered vehicle having continuous access to an external third source of power or energy, which here is designated "III" and "s1" for a stationary station.

The vehicle 1 according to the invention is also to comprise a not shown steering arrangement 3 or steering equipment so that a driver "F" (not shown) can drive and steer the vehicle 1 along said stretch of roadway 2 and its road section or portion 2a1.

Vehicle 1 would also be able to include a gear box and other parts and components which are required for advancing the vehicle, but as these parts are well-known to a person skilled in the art they will not be described in detail.

However, an electrically driven vehicle 1 does not need a gear box as speed control, and adapted power can occur over known electric and electronic circuits.

Figure 1B:
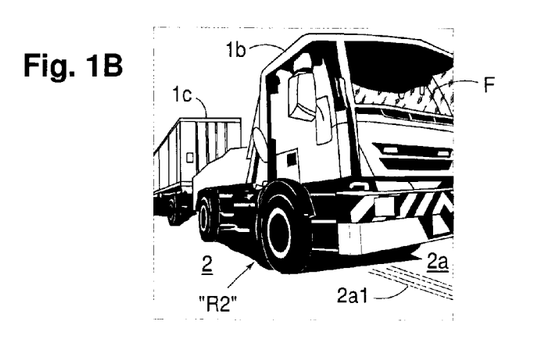
FIG. 1B shows a perspective view of a truck with a trailer and with a control circuit controlling the power, in accordance with the basic principles of FIG. 1A.

In the same manner as FIG. 1A, FIG. 1B shows an electrically propellable truck 1b with a connected trailer 1c along the stretch of roadway 2, 2a and its associated roadway section or portion 2a1.

Figure 1C:
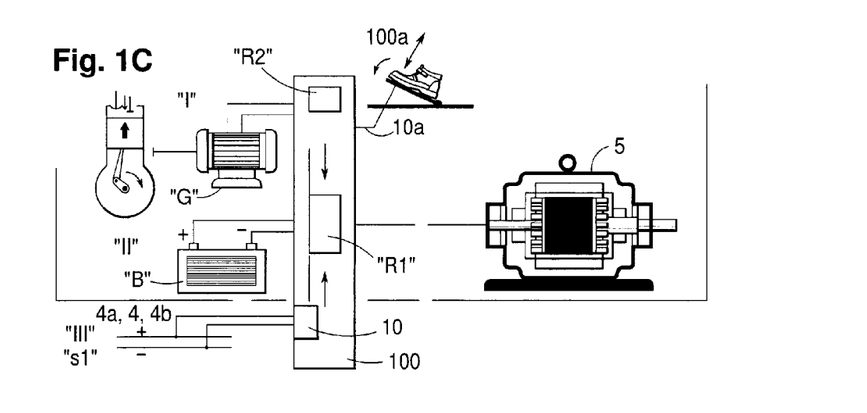
FIG. 1C shows in an overview two vehicle-related power sources, a first one ("I"), a diesel generator, a second one ("II"), a battery or a battery set, and a third one ("III"), an external source of power to the vehicle, feeding electric power to parallel conductor surfaces, such as rails or strips, which may be subjected to power or voltage and which surfaces are arranged in continuous grooves in a roadway, are coordinated to a vehicle-related control circuit, which in response to a necessary supplied power to an electric motor makes possible the selection of all or a combination of the power-feeding sources of energy, wherein the power control is illustrated here as a throttle, having its motion, related to a control circuit "R2"

FIG. 1C clearly shows three vehicle-related and vehicle-associated sources of power, which here are designated "I", "II" and "III", a "first" one in the form of a diesel generator "G", a "second" one in the form of a battery or a set of batteries "B", and a "third" one in the form of a source of power positioned externally of the vehicle 1, here taking the form of parallel conductive surfaces, such as conductors, rails or strips, which may be subjected to power or voltage over switching means or switches, and introduced into tracks, grooves and/or a cavity along each roadway section or portion along the entire stretch of the road 2.

In FIG. 1C the three sources of power are coordinated to a vehicle-related power control circuit 100, which in response to power supplied to an electric driving motor 5 chooses all or a combination of the three power feeding energy sources "I", "II" and "III", respectively. Here the power control is illustrated as a throttle 100a, the movement of which upwards and downwards is connected to a control circuit "R2" in power control circuit 100, which in turn is related to a circuit "R1" distributing power and energy between the three power sources.

Figure 1D:
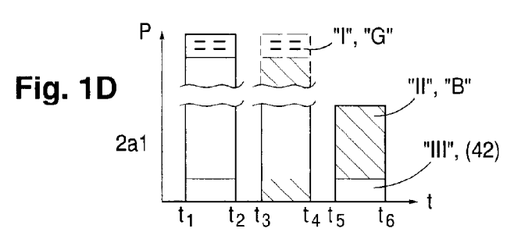
FIG. 1D illustrates a P/t-diagram (power/time) wherein full power or reduced power is to be transferred over the control circuit to the vehicle so it can pass along a roadway, its road sections or portions and its conductors or strips, FIG. 2 basically shows an electric arrangement related to a vehicle having control equipment for controlling a current collector or commutator arranged against electric contact surfaces, with paired conductors shaped as rails or strips for enabling parallel operation of an electric vehicle-related motor from one or both of the two power sources (first and second ones) related to the vehicle and/or from the stationary (third) source of power related externally to the vehicle or the peripheral (third) source of power.

In a P/t (power/time) diagram FIG. 1D illustrates how full power or reduced power can be distributed and transferred for passage of the vehicle 1, 1b along different roadway sections or portions 2a1 of a roadway or stretch of a roadway 2 with the help of said circuit "R1" and control circuit "R2" and the power control circuit "100".

Between moments $t_1$-$t_2$ it is basically illustrated how complete removal of power from the three power sources "I", "II" and "III", respectively, can be carried out, with the power taken out from the power source "I" illustrated at the top, the power taken out from power source "II" illustrated therebelow, and the power taken out from power source "Ill" illustrated at the bottom.

Reduced removal of power from power sources "I" and "II" is basically illustrated between the points of time $t_3$-$t_4$, whereas power source "III" is shown disconnected in this case.

Reduced removal of power from power sources "II" and "III" is illustrated basically between the points of time $t_5$-$t_6$.

During this time period $t_5$-$t_6$ full power can be achieved from power source "II" and a small surplus can be permitted to be fed to the motor 5 and trickle charge the battery set "II", "B".

The invention is based on that the set of batteries "B" and the second power source "II", but particularly the third power source "III" primarily shall, over the distributing circuit "R1", supply motor 5 with power, and for this purpose the set of batteries "II", "B" will have to have stored power and apart from this will have to be dimensioned so as to drive motor 5 at full power.

The set of batteries "II", "B" is primarily to be trickle charged via power source "Ill", "s1" and secondarily to be trickle charged or charged over power source "I", "G".

The power or energy from power sources "I" and "III" can be chosen to be 5-30% of the power or energy associated with power source "II", "B", such as around 25%.

The supply power or voltage to motor 5 can be chosen to +400 VDC and −400 VDC, i.a. the voltage value of 800 VDC is to be supplied to the motor 5.

System "S" in FIG. 1A is then primarily to comprise "a" one or more over an individual electric motor 5 or motors electrically powerable vehicles 1, 1b, with the respective vehicle exhibiting a power distributing and/or controlling control circuit "R1" within said power control circuit 100, and for creating a necessary power and/or a speed control via a control circuit "R2" and a throttle arrangement 100a.

The necessary output power is to be supplied primarily by the vehicle-internal power source of energy "II", "B", which secondarily is to be placed under trickle charging from the third power source of energy "III", "s1".

Figure 4:
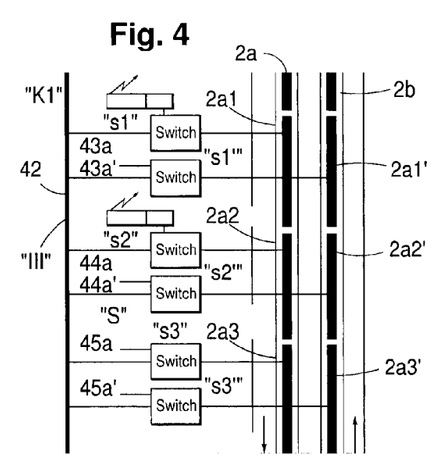
FIG. 4 shows an example of an electric arrangement in which a number of road sections are provided with parallel conductors under tension, each one being connectable over a switch to its vehicle external or vehicle peripheral electric station and in which roadway section after roadway section may be activated and are placed under power by the activation of a coupling means or a switch over a control unit as said vehicle passes roadway section after roadway section.

In FIG. 4 the stretch of a roadway 2 is shown divisible into road sections or portions 2a (2a1, 2a2, 2a3); 2b (2a1', 2a2' and 2a3'), wherein each one to advantage can be allotted to an external power source "III" which here is illustrated as a number of electric stations "s1", "s2", "s3"; "s1'", "s2'", "s3'".

Of the third power source "III", "s1" external to the vehicle 1 and/or the first power source "I", "G" associated with the vehicle, one or both can thereby be utilized for supplementary charging the set of batteries "II", "B" of the vehicle 1 during an adapted time sequence of power removal from this set of batteries.

Within the scope of the invention there is also the possibility of in addition to driving the vehicle 1 via the set of batteries "II", "B" and in supplementary charging the set of batteries "II", "B" along the road sections or portions and the stationary electric station "s1" or any of the third power sources of energy "III", any additional necessary power and energy for driving the vehicle 1 over a road section or portion 2a1 can be supplied via power source "I", "G" associated with the vehicle.

FIG. 2 basically shows an electrical/mechanical switching arrangement "K" related to a vehicle 1, (1b) in a schematically illustrated vehicle-related arrangement in the form of control equipment 10 for controlling a contact member or a current remover or collector 4 associated with the vehicle 1 and to an electric contact with pairs of contact surfaces, as leads or strips, which may be placed under power or voltage and in the form of rails or strips 4a, 4b for the possible common driving in parallel of an electric motor 5 from the set of batteries "II", "B" and/or from the stationary station "III", "s1" and/or from the diesel generator "I", "G".

In this case current remover or collector 4 is related to a support 6 which may be displaced upwards and downwards vertically by means of a first electric auxiliary motor 7 and may be moved sideways back and forth by a second electric auxiliary motor 8.

The means and the control of auxiliary motors 7, 8, which are required for this movement with the assistance of sensors, are not shown in detail.

Both auxiliary motor 7 and auxiliary motor 8 may be activated in a movement directed forward and backward, wherein a first motion is activated over a first signal on a first conductor 7a and a first signal over a first conductor 8a, respectively, whereas a second (opposite) motion is activated by means of a second signal over conductors 7a and 8a, respectively, while the instantaneous setting positions of motors 7, 8 and support 6 are evaluated by one or more, not shown, sensors and are indicated by means of a generated signal on a second conductor or lead 7b and 8b, respectively.

These signals on the first conductors 7a, 8a are generated in a central unit or a power control circuit 100 having control equipment 10, and signals on the second conductor 7b and 8b are generated in the same central circuit 100 while utilizing position sensors (not shown).

Said power control circuit 100 with control equipment 10 is a complex unit, which i.a. over a sensor 16 is to be able to sense the existence of and the orientation of conductor surfaces, as conductors or strips 4a, 4b, and thereafter lower the current remover or collector 4 by means of auxiliary motor 7 to electric contact with these two conductors 4a, 4b, which here are illustrated as being placed under voltage.

Over a connection 10a to power control circuit 100 and its control circuit "R2" the power and energy which over circuit "R1" distributes the energy sources, is supplied to motor 5, and is here controlled by throttle arrangement 100a. For this purpose circuit "R2" will have to be controlled directly by said throttle arrangement 100a (FIG. 1C) so as to supply motor 5 with the required power over the circuit "R1".

In the illustrated position the current collector or remover 4 conducts current and voltage from power source "s1", "III" over to the power and energy distributing circuit "R1". The latter or a control circuit "R2" senses the power requirement of motor 5 over its central unit 100 and primarily feeds motor 5 with the power it needs according to the input signal on the connection or conductor 10a and generated output signal on the connection or conductor 10b so as thereby to load the stationary system "III", "s1" and supplement the power and energy requirements over battery settings "II" "B".

Connecting in parallel the power "III", "s1" taken out of the vehicle externally and the power "I", "G" and/or "II", "B" generated within the vehicle can here be carried out over circuits "R1" and control circuit "R2" and with the assistance of power control circuit 100.

Information about a desired speed and thereto related power of vehicle 1 is supplied to power central circuit 100 over conductor 10a, and circuit "R1" is affected over conductor 10b via internal circuits, which are not shown, and the function of the control circuit "R2", and control equipment 10.

Figure 3:
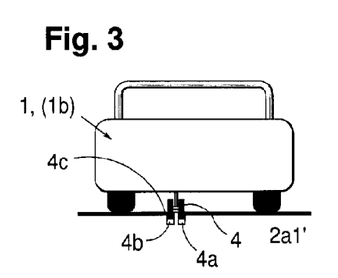
FIG. 3 shows an end view of a vehicle with its downwardly directed contact means or current collectors in the form of a sliding contact in cooperation with two individual contact surfaces, as conductors, strips or rails, allotted to the road section or portion and being under power or tension.

FIG. 3 shows an end view of a vehicle 1, (1b) with its downwardly directed current collector or remover 4 in mechanical and electrical cooperation with the two live contact surfaces, as conductors, rails or strips 4a, 4b associated with road portion 2a1' and a connection 4c to ground.

FIG. 4 shows an electric switching arrangement "K1", in which roadway section or portion after roadway section or portion 2a1, 2a2, 2a3 and 2a1', 2a2' and 2a3', respectively, with their station or stations "s1", "s2", "s3" and "s1'", s2'" and "s3'", respectively, can be activated and made to conduct power as voltage from one and the same controlled power source "III", 42 over switching means and switches 43a, 44a, and 45a for one stretch of a roadway 2a and 43a', 44a' and 45a' along the opposite stretch of a roadway 2b, depending on whether a vehicle 1, 1b will pass along the electrically separate but with longitudinal tracks or grooves coordinated roadway 2a, 2b sections or portions.

For this a number of switches or connecting means for connecting and disconnecting stations "s1", "s2" . . . will be needed, wherein this connecting and disconnecting can occur over stationary sensors (not shown) related to the section or portion of the roadway.

This invention is based on the prerequisites mentioned above and indicates, according to FIG. 5, that two current collectors 41, 41' as connecting means are electrically connected parallel, and are intended to be able to run freely along the track 51 allotted to a roadway section 2a1.

Figure 6:
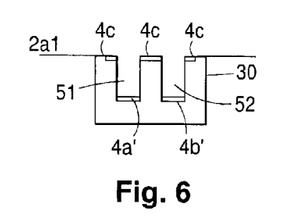
FIG. 6 shows in a cross section of a canalization having two conductor surfaces or contact surface, which may be subjected to electric voltage, and which are positioned in individual tracks in a canalization.

FIG. 6 illustrates in a cross-sectional view, a roadway related track in the form of a groove, having two tracks or slits 51, 52 in a canalization 30 exposing within the bottom areas of said slits 51, 52 contact surfaces 4a', 4b' and on top of said slits 51, 52 a 0-potential or ground potential exposing a contact surface 4c, arranged along the upper surface of said roadway section 2a1.

Figure 7:
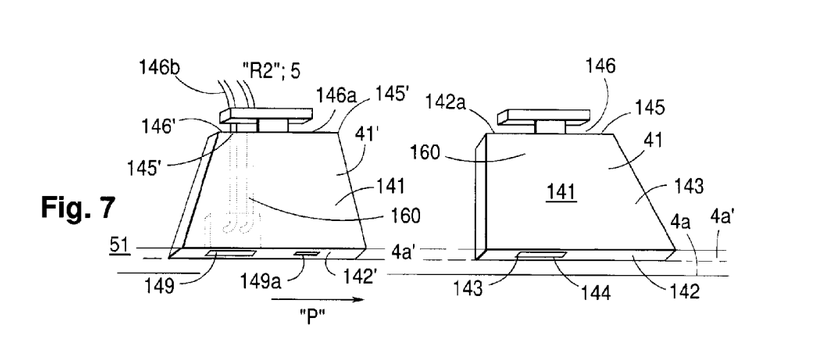
FIG. 7 illustrates in a perspective view the structure of two in series related current collectors, positioned after each other, in a normal and chosen direction of movement "P" of the vehicle, related to one and the same track, FIGS. 8 and 9, respectively, show side views of two different contact means or current collectors, structured for cleaning or cleansing the track by means of compressed air.

According to FIG. 7 each of the two current collectors 41, 41'; (41), (41') is formed as a main portion 141, 141' shaped mainly from an electrically insulating material, the lower surface 142, 142', facing the conductor surface or contact surface 4a', subjected to voltage, is of a flat shape or of at least essentially a flat shape, with said lower surface 142, 142', shaped and formed from an electric conductive material 160, consisting of a lower contact surface 144; 149a, 149, with the electrically conductive material 160 being adapted to extend through the main portion 141, 141', for forming one or more upper contact surfaces 146, 146' and 146a terminated along the upper surface 145, 145' of the main portion 141, 141' and/or connecting to conductors 146b to the vehicle 1 related motor 5, via vehicle related control units and control circuits.

The main portion 141, 141' is allotted a surface extension along the track 51 and having a thickness connecting to the width of track 51 and having a shape of a parallelogram or an oblique parallelepiped.

The upper 145, 145' and the lower 142, 142' surfaces of the parallelepiped or main portions 141, 141' are parallel adapted.

Two or more current collectors 41 and 41' are, according to FIG. 7, in series and parallel coordinated in a stretch along a track 51, 52 with one pair 41, 41' cooperating with one and the same conductor surface or contact surface 4a', which may be placed under voltage, and apart from this adapted to form parallel conductive paths between the contact surface 4a' and the vehicle related motor 5

FIG. 7 illustrates that a first main portion 41 is allotted a parallelepipedic shape, which deviates from the parallelepipedic shape of a second main portion 41'.

Two or more lower contact surfaces, designated 149a, 149 for a current collector 41' are allotted to said lower contact surface 4a', which may be subjected to voltage.

Figure 5:
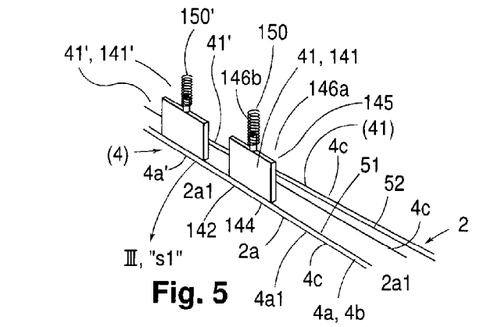
FIG. 5 is a perspective illustration showing how pairs of connecting means or current collectors are to cooperate with one and the same track and its conductor surface or its contact surface, which may be subjected to energy via a third power source or voltage.

Two or more current collectors 41, 41' and (41), (41'), respectively, are disposed parallel to each other and allotted to each one of two or more parallel tracks 51, 52, according to FIG. 5.

Current collectors 41, 41'; (41), (41') related to the vehicle 1 are, with at least their lower contact surfaces 144, 149a, 149 formed of steel, stainless steel, copper, brass, bronze, aluminum and/or hard coals.

At least one lower contact surface is shaped as a brush unit, consisting of steel, stainless steel, copper, brass, bronze, aluminum, and/or hard coals.

Conductor surface or contact surface 4a', which may be placed under voltage, is structured as a rail of steel, stainless steel, copper, brass, bronze, aluminum, and/or hard coals.

The lower contact surface 143, 144; 149a, 149 are adapted to engage and press against the contact surface 4a', with a force of between 1 and 15, such as 2-5, or around 3 N/cm².

Said two or more contact surfaces 4a', 4b', which may be subjected to voltage, are coordinated along the bottom area of the respective track 51, 52 in a canalization 30, according to FIG. 6 and the roadway section 2a1 has its resp. upper surface in line with the open parts of said tracks 51, 52.

Said conductor surfaces or contact surfaces 4a', 4b', which may be subjected to voltage, are shaped as tracks, rails or bands, with an upper broad contact surface 4a', 4b' and with a limited thickness.

Canalization 30 and its contact surfaces 4a', 4b', its tracks 51, 52 and its contact surface 4c is shaped as an elongated unit and shaped elastically so that it can be bent to a roll.

Contacts 144; 149a, 149 consist of hard coals, in which two or more conductors 146b have been attached, in accordance with FIG. 7.

Figure 8:
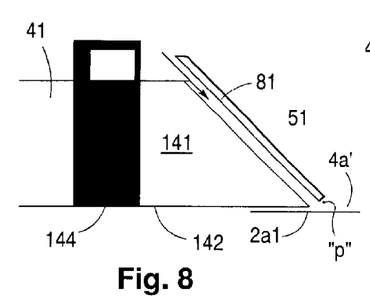

FIG. 8 illustrates in a side view an alternative embodiment of a contact means serving as a current collector 41, having a channel 81 adapted for compressed air in the front portion of the current remover or collector, counted in the direction of motion, with the purpose of flashing away, by means of said air, small contaminating particles "p", such as sand or water, from conductor surface 4a' before it is to make electric contact with its contact surface 144 and contact surfaces 149a and 149 related to the current collector 41'.

Figure 9:
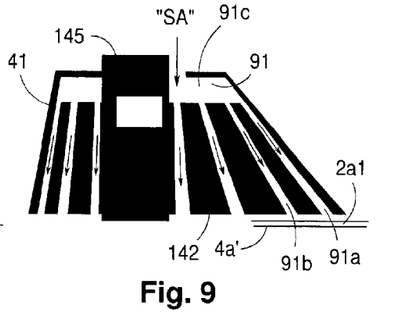

FIG. 9 illustrates an additional alternative embodiment of a current collector 41, having channels 91, 91a, 91b and additional channels adapted for compressed air, wherein channel 91 is to be considered more as a connecting channel to a not shown source "SA" of compressed air, whereas channels 91a, 91b, 91c etc, take the form of a fan, having an adapted cross section towards the contact surface 4a', and a diverging cross section 91a towards the contact surface 4a' and/or a converging cross section 91b to contact surface 4a'.

Figure 10:
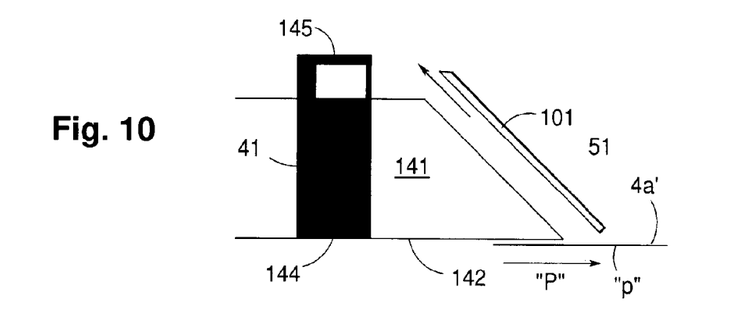
FIG. 10 shows a side view of a contact means or a current collector structured for suppressed cleaning or cleansing of the track, in the form of a cooperation between a vehicle related contact surface and a conductor surface or roadway related contact surface, subjected to voltage.

FIG. 10 illustrates in a side view an embodiment of a current collector 41 having a channel 101, adapted for a negative pressure in the foremost portion of the current collector 41, counting in the direction of motion "P", with the purpose of sucking away smaller polluted particles "p", such as sand, from contact surface 4a'.

In FIGS. 8 and 9 it is proposed that the flow of air current be generated by a compressed air generator "SA", which typically can generate a pressure of 10 bars.

The flow of air will clean out sand and dust "p" effectively before the current collector 41 with its sensitive sliding contacts 144 turns up.

The compressed air "SA" is generated by a compressor within the vehicle 1 and is led by means of flexible hoses to the current remover 41, 41'; (41), (41') in FIG. 5.

With compressed air it can be advantageous to use said air as a cleaning or cleansing flow on a pillow of air, so as to thereby minimize wear. Furthermore, a flow of compressed air can be discharged forwardly for a cleansing off sand and dust.

It is suggested that the sliding contact 144 consist of hard coals and is of a type that has been used as a current collector or pantograph for street cars and trains.

Figure 11:
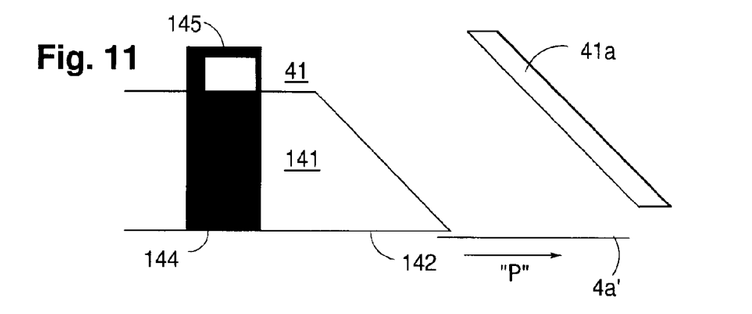
FIG. 11 shows a side view of a contact means or current collector, with a whirl zone in front of said means.
Figure 12:
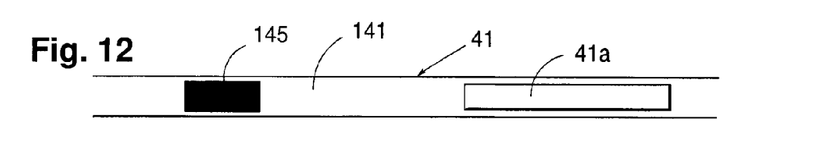
FIG. 12 shows a contact means as illustrated in FIG. 11 in a horizontal view.

FIGS. 11 and 12 illustrate in a side view and in a horizontal view a current remover collector 41 having a disc 41a generating forward an air turbulence, counting in the direction of motion "P", said disc 41a being disposed a bit over said conductor surface 4a'.

Figure 13:
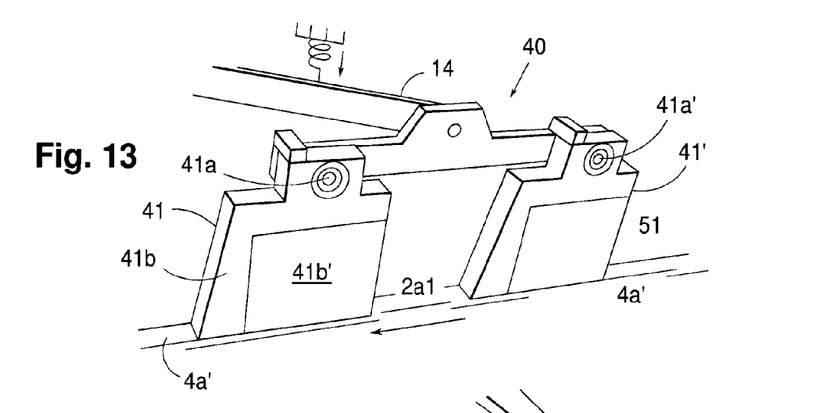
FIG. 13 illustrates in a perspective view two individual contact means or current collectors in an alternative embodiment, exposing a first contact unit and a second contact unit, each contact unit having a first, an electric insulating, part and a second, an electric conductive, part.

FIG. 13 illustrates in a perspective view a contact means 40 oriented in a groove 51 enclosing a single contact surface 4a' and carrying two contact units 41, 41' pivotally attached to an arm structure 14 via an axle 41a, 41a' in order to be turned, by a collision towards a solid obstacle "H", from a first position (FIG. 13) in contact with said surface 4a' to a second position out of contact with said surface 4a' (FIG. 15) or vice versa.

Each of said contact units 41, 41' are exposing two subparts 41b, 41b', one electrically insulating and soft subpart 41b is arranged and intended to protect a second electrically conductive and hard subpart 41b'.

Figure 14:
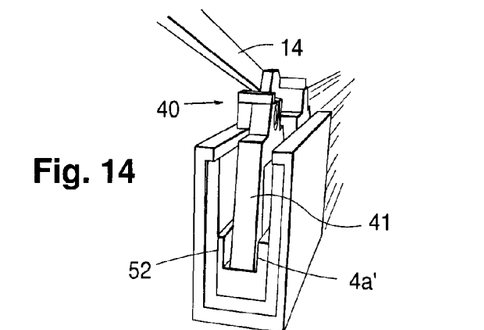
FIG. 14 illustrates the first contact unit in cooperation with a track or a groove, and in the bottom area of which is arranged one single contact surface.

FIG. 14 illustrates the first contact unit 41 in cooperation with a track 52 and in the bottom area arranged contact surface 4a'.

Figure 15:
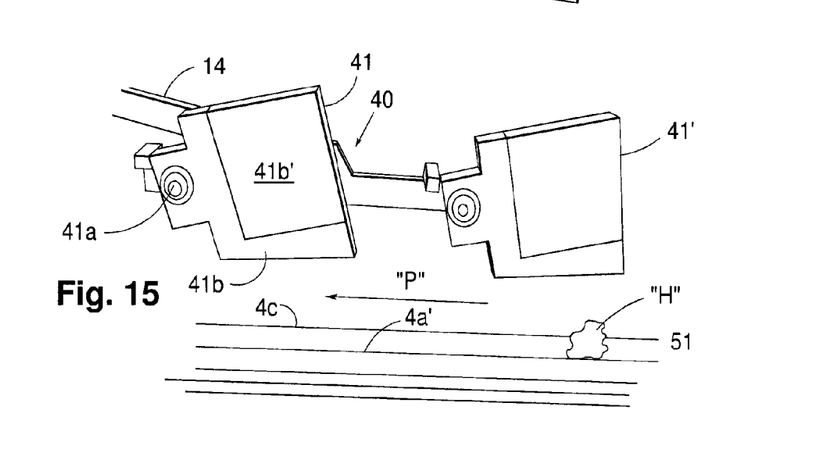
FIG. 15 illustrates in a perspective view, similar to FIG. 13, a contact means as a current collector, exposing a first contact unit and a second contact unit, in an upraised position, where these two units have been rotated to said raised position by movement of each contact units, caused by a collision with a fixed obstacle.

FIG. 15 illustrates in a perspective view, similar to FIG. 13, a contact means 40 or current collector, exposing a first contact unit 41 and a second contact unit 41', in a raised position, where these two units 41, 41' have been rotated to said raised position by the movement of the contact units 41, 41' caused by a collision with an obstacle "H".

The invention is of course not limited to the embodiment disclosed above as an example, and it can be subjected to modifications within the frame of the inventive concept illustrated in the following claims.

It should be particularly noted that each shown unit and/or circuit can be combined with each other illustrated unit and/or circuit within the frame of being able to reach the desired technical function.

Some of the following reference numerals have been introduced into FIGS. 1 to 4;
a. 1. Vehicle illustrated as a Ford Model A.
b. 1b. Truck c. 1c. Trailer to truck "b".
d. 2. Stretch of a roadway
e. 2a. Roadway in one traveling direction
f. 2b. Roadway in an opposite traveling direction
g. 2a1. Roadway section in one traveling direction
h. 2a1'. Roadway section in an opposite direction
i. 3. Steering equipment
j. 4. Vehicle related contact means as current remover
k. 4a. Electrical conductive first rail
l. 4b. Electrical conductive second rail
m. 4c. Roadway section related electrical conductor
n. 4a'. Electrical conductive first surface
o. 4b'. Electrical conductive second surface
p. 5. Vehicle related DC-motor
q. 6. Support for vehicle related contact means (j)
r. 7, 8. Auxiliary motors
s. 10. Control equipment for contact means (j)
t. 30. Canalization for electric conductors (k, l, m.) and including grooves (u, v.)
u. 51. First roadway section related groove
v. 52. Second roadway section related groove
w. 100. Power control circuit
x. "I". First vehicle related power source (Generator)
y. "II". Second vehicle related power source (Battery set.)
z. "III". Third power source, vehicle external (Ground Station)
aa. "F". Driver (not shown.)
bb. "R1". Energy distributing and three power sources controlling circuit
cc. "R2". Control circuit for energy distribution (Speed control)
dd. "5". Vehicle and roadways related system

The invention claimed is:

1. A vehicle-related arm-shaped contact means comprising a current collector and related to a system for propelling an electrically propellable vehicle, by one or several batteries or a set of batteries, along a roadway, said system comprising
    a) a plurality of roadway sections for subdividing the roadway, wherein each one of the roadway sections comprises one or more elongated tracks or slits, having conductors introduced therein adapted to be supplied with current and put under voltage, connectable via a switch to one or more vehicle-external power sources, including electric stations, for thereby enabling charging of said set of batteries belonging to the vehicle, but primarily driving the vehicle over the set of batteries along the roadway and the roadway sections, and
    b) one or more propellable vehicles which may be driven by means of an electric motor or motors, with each of the respective vehicles comprising a control circuit adapted for necessary distribution of power, and for providing required power and/or speed control, wherein said vehicle is provided on the underneath side with contact means comprising a current collector, displaceable up and down and sideways, in relation to the direction of transportation of the vehicle,
    wherein said elongated track or tracks and the conductors extend along the roadway and the roadway sections, and wherein said contact means is coordinated with a vehicle-related control equipment for bringing the contact means into mechanical and electrical contact with said conductors,
    wherein coordination between the conductors arranged in the roadway section and the contact means of the vehicle occurs via the current collector, in the form of contact springs, adapted for mechanical and electrical cooperation with respective ones of the conductors,
    wherein said contact means with the current collector is adapted to run freely along the track, oriented along the roadway,
    wherein said current collector comprises a main portion, made of an electrically insulating material, said main portion having a lower surface facing towards a contact surface of the conductor, which is to be put under voltage, and being shaped essentially flat, having a lower contact surface formed in said lower surface and consisting of an electrically conductive material,
    wherein the electrically conductive material is adapted to extend through the main portion to form one or more upper contact surfaces and/or connecting conductors on an upper surface of the main portion,
    wherein said contact surface of the conductors is arranged at the respective bottom of the elongated tracks which are arranged in a canalization in the roadway, and
    wherein the main portion comprises a surface extension along the track having a thickness corresponding to the width of the track and having a shape corresponding to the shape of a parallelogram or an oblique parallelepiped.

2. Contact means in accordance with claim 1, wherein the upper and lower surfaces, respectively, of said parallelepiped are substantially parallel.

3. Contact means in accordance with claim 1, wherein two or more current collectors are coordinated in an extension along a track together with one and the same contact surface of the conductor, and apart from this are adapted for forming two current paths, connected in parallel, indirectly to the vehicle related motor.

4. Contact means in accordance with claim 3, wherein a first main portion of a first current collector comprises a parallelepiped shape, which deviates from a second main portion of a second current collector having a mainly parallelepiped shape.

5. Contact means in accordance with claim 4, wherein said lower surface of the second main portion comprises two or more lower contact surfaces.

6. Contact means in accordance with claim 5, further comprising a resilient member adapted to press each main portion and the lower contact surface or lower contact surfaces against the contact surface of the conductor.

7. Contact means in accordance with claim 6, wherein the resilient member is adapted to urge each lower contact surface towards said contact surface with a force of between 1 and 15 $N/cm^2$.

8. Contact means in accordance with claim 1, comprising two or more current collectors disposed in parallel to each other and arranged to run in individual ones of two or more parallel tracks.

9. Contact means in accordance with claim 1, wherein at least the lower contact surface of the current collector is formed of steel, stainless steel, copper, brass, bronze, aluminum, and/or hard coals.

10. Contact means in accordance with claim 9, wherein at least the lower contact surface of the current collector is shaped as a brush unit.

11. Contact means in accordance with claim 1, wherein the two or more conductors and/or the contact surfaces are structured of steel, stainless steel, copper, brass, bronze, aluminum, and/or hard coals.

12. Contact means in accordance with claim 1, wherein the current collector comprises one or more channels adapted to lead one or more air streams and/or currents under overpressure against the contact surface.

13. Contact means in accordance with claim 1, wherein the current collector comprises one or more channels adapted to lead one or more air flows, in a negative pressure, from the contact surface.

* * * * *